(12) United States Patent
Furmanczyk et al.

(10) Patent No.: US 10,549,979 B2
(45) Date of Patent: Feb. 4, 2020

(54) METHOD FOR CONTROLLING A FILLING OPERATION OF A VEHICULAR LIQUID STORAGE SYSTEM

(71) Applicant: PLASTIC OMNIUM ADVANCED INNOVATION AND RESEARCH, Brussels (BE)

(72) Inventors: Ed Furmanczyk, Fenton, MI (US); David Hill, Commerce Township, MI (US); Bjorn Criel, Sint-Martens (BE)

(73) Assignee: PLASTIC OMNIUM ADVANCED INNOVATION AND RESEARCH, Brussels (BE)

( * ) Notice: Subject to any disclaimer, the term of this patent is extended or adjusted under 35 U.S.C. 154(b) by 251 days.

(21) Appl. No.: 15/315,166

(22) PCT Filed: May 29, 2015

(86) PCT No.: PCT/EP2015/062024
§ 371 (c)(1),
(2) Date: Nov. 30, 2016

(87) PCT Pub. No.: WO2015/181375
PCT Pub. Date: Dec. 3, 2015

(65) Prior Publication Data
US 2017/0190564 A1    Jul. 6, 2017

Related U.S. Application Data

(60) Provisional application No. 62/005,508, filed on May 30, 2014.

(30) Foreign Application Priority Data

Jul. 2, 2014  (EP) .................................... 14175481

(51) Int. Cl.
*B67D 7/08* (2010.01)
*B60K 15/03* (2006.01)
(Continued)

(52) U.S. Cl.
CPC .......... *B67D 7/08* (2013.01); *B60K 15/03006* (2013.01); *B67D 7/02* (2013.01);
(Continued)

(58) Field of Classification Search
CPC ... B67D 7/08; B67D 7/02; B67D 7/04; B67D 7/362; B60K 15/03; B60K 15/03006;
(Continued)

(56) References Cited

U.S. PATENT DOCUMENTS 4,531,293 A * 7/1985 Grinde .................... G01F 23/04
                                                         116/227
5,649,577 A * 7/1997 Farkas .................... B67D 7/362
                                                         137/393
(Continued)

FOREIGN PATENT DOCUMENTS

CN       1890539 A       1/2007
DE    199 01 080 A1      7/2000
(Continued)

OTHER PUBLICATIONS

Oregon Department of Environmental Quality: Topping-Off Ban https://www.oregon.gov/deq/aq/programs/Pages/Top-Off-Ban.aspx (Year: 2009).*
(Continued)

*Primary Examiner* — Timothy L Maust
*Assistant Examiner* — James R Hakomaki
(74) *Attorney, Agent, or Firm* — Oblon, McClelland, Maier & Neustadt, L.L.P.

(57) ABSTRACT

A method for controlling a filling operation of a vehicular liquid storage system including a tank including a fill level
(Continued)

limiting valve. The method includes: detecting start of a first filling event; measuring a first fill level of the tank; verifying whether the measured first fill level has reached a predetermined fill level; if the verifying is positive, starting a first timer for a first amount of time; upon expiry of the first timer, closing the fill level limiting valve.

13 Claims, 4 Drawing Sheets

(51) Int. Cl.
    *B67D 7/02*     (2010.01)
    *B67D 7/04*     (2010.01)
    *B67D 7/36*     (2010.01)

(52) U.S. Cl.
    CPC ............... *B67D 7/04* (2013.01); *B67D 7/362* (2013.01); *B60K 2015/0319* (2013.01); *B60K 2015/03019* (2013.01); *B60K 2015/03026* (2013.01); *B60K 2015/03217* (2013.01)

(58) Field of Classification Search
    CPC ........ B60K 15/035; B60K 2015/03019; B60K 2015/0319; B60K 2015/03217; B60K 2015/03566; B60K 2015/03576; B60K 2015/0358
    USPC ...................................................... 141/95, 96
    See application file for complete search history.

(56) References Cited

U.S. PATENT DOCUMENTS

| | | | | |
|---|---|---|---|---|
| 5,878,727 | A * | 3/1999 | Huls | F02D 41/28 123/520 |
| 6,252,499 | B1 * | 6/2001 | Gerdtz | G01F 23/0076 340/450.2 |
| 6,253,802 | B1 * | 7/2001 | Enge | B60K 15/03519 123/518 |
| 6,282,953 | B1 * | 9/2001 | Benjey | B60K 15/077 73/1.32 |
| 6,289,947 | B1 | 9/2001 | Heimbrodt et al. | |
| 6,435,164 | B1 * | 8/2002 | Kaiser | F02M 25/0809 123/1 A |
| 6,488,015 | B2 * | 12/2002 | Isobe | F02M 25/089 123/198 D |
| 7,634,347 | B2 | 12/2009 | Hill et al. | |
| 8,928,469 | B2 * | 1/2015 | Newhouse | G01F 23/0061 340/425.5 |
| 9,429,460 | B2 * | 8/2016 | Trump | G01F 11/00 |
| 2002/0194911 | A1 * | 12/2002 | Allegre | G01F 23/2927 73/293 |
| 2004/0204870 | A1 | 10/2004 | Schimnowski et al. | |
| 2005/0115314 | A1 * | 6/2005 | Meagher | G01F 23/14 73/290 B |
| 2006/0137429 | A1 * | 6/2006 | Henschel | G01F 23/32 73/1.73 |
| 2008/0302439 | A1 * | 12/2008 | Spanke | G01F 23/28 141/1 |
| 2010/0242595 | A1 * | 9/2010 | Paine | G01F 23/0038 73/304 C |
| 2014/0117015 | A1 | 5/2014 | Kraus | |
| 2014/0190591 | A1 * | 7/2014 | Scott | B60K 15/03 141/96 |
| 2015/0211914 | A1 * | 7/2015 | Dudar | G01F 23/246 73/292 |
| 2015/0251893 | A1 * | 9/2015 | Jonasson | B67D 7/46 141/1 |

FOREIGN PATENT DOCUMENTS

| | | |
|---|---|---|
| DE | 100 20 000 A1 | 12/2001 |
| JP | 2008-518151 | 5/2005 |
| WO | WO 2012/057659 A1 | 5/2012 |

OTHER PUBLICATIONS

International Search Report dated Aug. 31, 2015, in PCT/EP2015/062024 filed May 29, 2015.

Japanese Office Action for JP 2017-514973, dated Jun. 3, 2019 (English translation provided).

* cited by examiner

METHOD FOR CONTROLLING A FILLING OPERATION OF A VEHICULAR LIQUID STORAGE SYSTEM

FIELD OF THE INVENTION

The present invention pertains to the field of vehicular liquid storage systems, in particular fuel tank systems.

BACKGROUND

U.S. Pat. No. 7,634,347B2 discloses a refueling system and method. The known refueling system includes: a fuel tank; a canister configured to adsorb fuel vapor generated inside the fuel tank; a canister drain cut valve coupled to the canister and configured to discharge air; an ignition sensor configured to detect whether the ignition of the combustion engine is switched on or off; and a refueling controller configured to open the canister drain cut valve when the ignition sensor detects that the ignition of the combustion engine is switched off. A method for refueling a motor vehicle can use the refueling system.

It is a disadvantage of the prior art that the maximum resolution of the level sensor and the maximum height that it can read (relative to the height at which rated capacity is met) limit the useful capacity of the vehicular liquid storage tanks. Any optimizations in that respect would require the change of hard-tooled components, which is disruptive and costly.

German patent application publication no. DE 199 01 080 A1, discloses a tank for a vehicle with a fuel container and at least one degassing device that can be closed by a valve, over which the gases in the fuel container can escape during a filling operation. To avoid expensive retooling and redesign of the degassing device of such a tank, when a different fuel container is to be used, it is proposed to open and close the degassing of the fuel container by means of a valve controlled by a controller. DE 199 01 080 A1 discloses monitoring the filling rate and filling level in order to determine the point in time at which the valve is to be closed to end the filling operation, and applying a smooth closing function to the valve so as to avoid a pressure shock. Hence, the system of DE 199 01 080 A1 is not able to terminate the filling operation at the most optimal point in time (i.e. with a maximally filled tank) when the filling operation is started with a fill level that is already above the highest level that can be correctly measured by the gauge.

SUMMARY OF THE INVENTION

It is an object of embodiments of the present invention to at least partially overcome the drawbacks of the prior art.

According to an aspect of the present invention, there is provided a method for controlling a filling operation of a vehicular liquid storage system comprising a tank equipped with a fill level limiting valve, the method comprising: detecting the start of a first filling event; measuring a first fill level of the tank; verifying whether the measured first fill level has reached a predetermined fill level; if the verifying is positive, starting a first timer for a first amount of time; upon expiry of the first timer, closing the fill level limiting valve.

Throughout the present description, the term "refueling" is used broadly to designate the addition of liquid (fuel or other, as the case may be) to the vehicular liquid storage system.

Throughout the present description, the term "fill level limiting valve" is used to designate an electronically controlled valve which can be opened or closed, as the case may be, by an electronic signal, with a view to allowing or stopping a refueling operation, and thus controlling the maximum fill level that can be achieved in the tank.

The present invention is based on the insight of the inventors that it is possible to define the time it takes at the maximum possible fill rate to complete the refueling up to full capacity after the level sensor's maximum height is met.

Where reference is made to verifying whether the measured level "has reached" a predetermined fill level, it shall be appreciated that the verification pertains to the observation of a predetermined value by means of the used measurement equipment. If the equipment has a certain maximum measurable level, the measured fill level will be observed as being "equal to" the maximum level as soon as the physical fill level reaches the maximum level, and continue to be "equal to" the maximum level as the physical fill level increases above this point. In this context, it is possible to assert that the measured fill level "has reached" the maximum level, without necessarily implying that the physical level of liquid in the tank is actually equal to the predetermined level.

It is an advantage of the present invention, that the effective capacity of the tank is increased, by allowing the tank to be filled in a safe manner beyond the maximum height that can be sensed by the level sensor.

In an embodiment of the method according to the present invention, the first amount of time is based on an estimate of an unused capacity of the tank.

It is an advantage of this embodiment that the tank can be filled in an optimal way, even in situations where merely monitoring the filling level and the filling rate would not suffice to determine the optimal point in time to shut off the filling operation.

In an embodiment, the method according to the present invention further comprises: obtaining an estimate of an amount of fuel consumed between the first filling event and a previous filling event; and determining the first amount of time on the basis of the estimated amount of consumed fuel.

It is an advantage of this embodiment that the method can also be used when the vehicle is presented for a refill when only a small amount of fuel has been used, and the fill level at arrival is still above the predetermined reference level.

In an embodiment, the method according to the present invention further comprises: detecting an end of the first filling event occurring during the first amount of time; and estimating a remaining unused capacity of the tank at the end of the first filling event.

It is an advantage of this embodiment that the method can also be used when the tank is not filled completely during a given filling operation, and a certain amount of tank capacity remains available for the next filling operation.

In a particular embodiment, the method further comprises: detecting the start of a subsequent filling event; measuring a subsequent fill level of the tank; verifying whether the measured subsequent fill level has reached the predetermined fill level; and if the verifying is positive: obtaining an estimate of an amount of fuel consumed between the subsequent filling event and the first filling event; determining a subsequent amount of time on the basis of the estimated amount of consumed fuel, increased by an amount proportional to the estimated remaining unused capacity of the tank; starting the first timer for the subsequent amount of time; and upon expiry of the first timer, closing the fill level limiting valve.

This embodiment takes advantage of the detection of a premature end of the previous filling event to increase the amount of time allowed for the present filling event, so as to ensure that the full capacity of the tank can be used. This embodiment applies in particular to situations where the predetermined fill level (maximum detectable level) is already reached at the beginning of the subsequent filling event, i.e. when only a small amount of fuel has been consumed between the "first filling event" and the "subsequent filling event".

In an embodiment of the method according to the present invention, the first amount of time is increased by an amount proportional to an estimate of an unused capacity of said tank at an end of a previous filling operation.

This embodiment also takes advantage of the detection of a premature end of the previous filling event to increase the amount of time allowed for the present filling event, so as to ensure that the full capacity of the tank can be used.

In an embodiment, the method according to the present invention further comprises: if the verifying is negative, starting a second timer for a second amount of time; upon expiry of the second timer, measuring a second fill level of the tank; determining the first amount of time on the basis of the first fill level, the second fill level, and the second amount of time.

This embodiment is based on the insight of the inventors that it is possible to calculate the fill rate during the filling operation and to use this rate to define a time to complete the refueling up to full capacity after the level sensor's maximum height is reached.

It is an advantage of this embodiment that the effective tank capacity can be maximized for any given filling operation, without requiring a prior knowledge of the filling rate.

In a specific embodiment, the verifying, the starting of the second timer, the measuring of the second fill level, and the determining of the first amount of time are carried out iteratively, and wherein a minimum value of the first amount of time as obtained over a plurality of iterations is used in the step of starting the first timer.

This embodiment reduces the risk of spill-overs during the refilling operation.

In a specific embodiment, the verifying, the starting of the second timer, the measuring of the second fill level, and the determining of the first amount of time are carried out iteratively, and wherein an average value of the first amount of time as obtained over a plurality of iterations is used in the step of starting the first timer.

This embodiment provides an advantageous trade-off between computational complexity, tank capacity maximization and reduction of the risk of spill-overs during the refilling operation.

In a particular embodiment, the method according to the present invention further comprises: determining a reference pressure level during the second amount of time; determining an end stage pressure level upon finding that the second verifying is positive; and adjusting the determined first amount of time in function of a ratio between the end stage pressure level and the reference pressure level.

It is an advantage of this embodiment that a change in filling rate between the initial stage of the refueling operation (before reaching the predetermined fill level (i.e., the maximum range of the level sensor) and the final stage of the refueling operation (i.e., the continuation of the refueling after reaching the maximum range of the level sensor) can be accounted for by changing the amount of time allowed for the final stage accordingly.

In an embodiment of the method according to the present invention, the vehicular liquid storage system is a fuel storage system.

The present invention can be applied in a particularly advantageous way to fuel tanks, which require frequent refilling, often by the vehicle's owner, and for which optimal tank volume usage is highly desirable.

In an embodiment of the method according to the present invention, the vehicular liquid storage system is a system for storing an aqueous urea solution.

The present invention can also be applied in an advantageous way to urea tanks. Urea solutions are used a reducing agent precursor in systems to treat engine exhaust gases by selective catalytic reduction of $NO_x$ components.

According to an aspect of the present invention, there is provided a computer program product comprising code means configured to cause a processor to carry out the method of any of the preceding claims.

According to an aspect of the present invention, there is provided a vehicular liquid storage system comprising a tank equipped with a fill level limiting valve, a level gauge, and a controller arranged to obtain fill levels from the level gauge and to control the fill level limiting valve, the controller being configured to carry out the method as described above.

According to an aspect of the present invention, there is provided a motor vehicle comprising the vehicular liquid storage system as described above.

The technical effects and advantages of the computer program product, the vehicular liquid storage system, and the motor vehicle according to the present invention correspond, mutatis mutandis, to those of the corresponding embodiments of the method according to the present invention.

BRIEF DESCRIPTION OF THE FIGURES

These and other technical aspects and advantages of embodiments of the present invention will now be described in more detail with reference to the accompanying drawings, in which.

DESCRIPTION OF EMBODIMENTS

Figure 1:
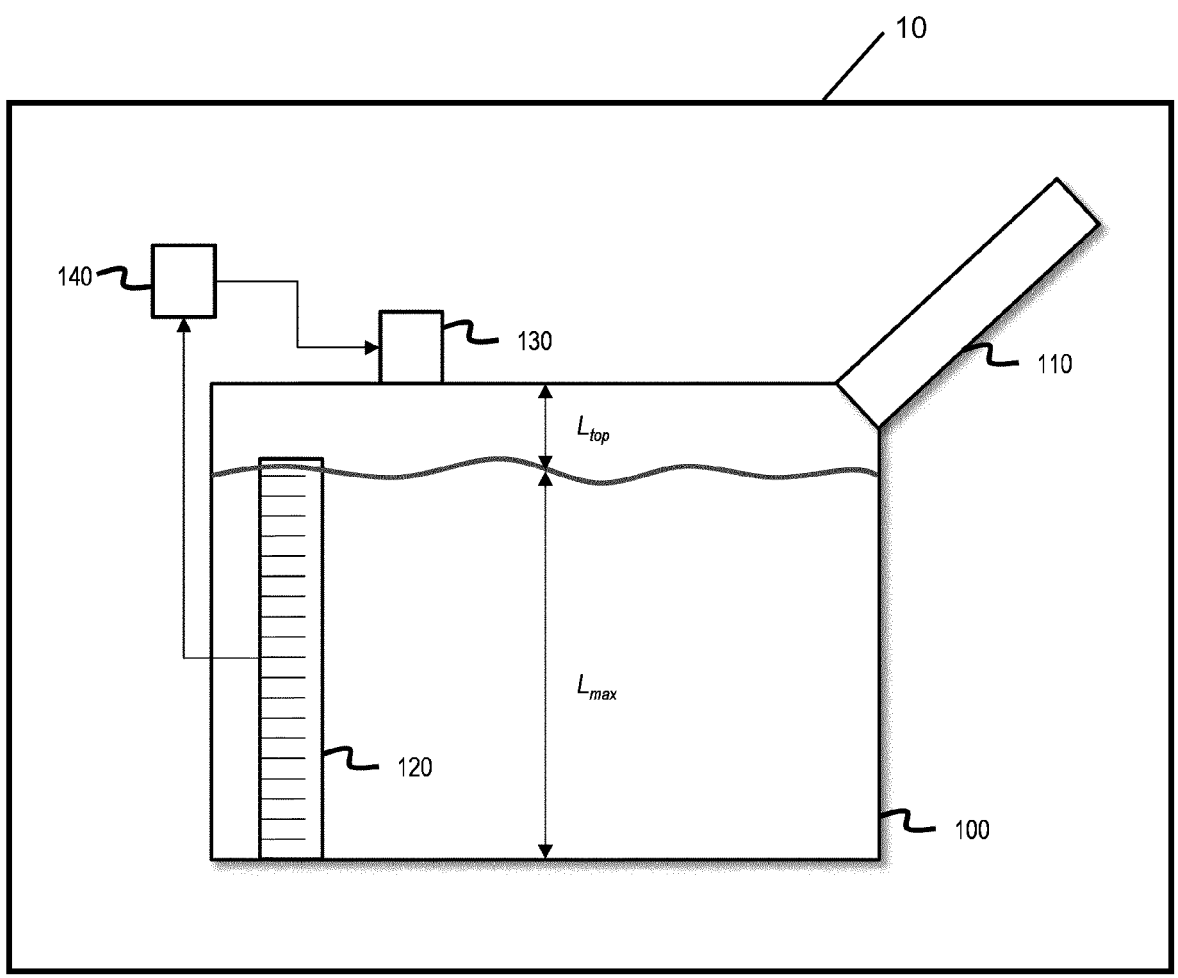
FIG. 1 presents a schematic overview of a vehicular liquid storage system in which the present invention can be used.

FIG. 1 presents a schematic overview of a vehicular liquid storage system, preferably a fuel storage system, in a vehicle 10 in which the present invention can be used. The system comprises a tank 100, in which a level gauge 120 is arranged. Without loss of generality, a tank 100 of a very simple geometry is shown; in reality, the tank may comprise multiple compartments, as is the case for a so-called "saddle tank". In that case, several level gauges would be present for the respective compartments, and the method according to the invention could be applied mutatis mutandis on the basis of the level readings from the compartments with the highest fill level.

Due to the physical limitations of the level gauge 120, such a gauge is usually unable to measure the level of liquid inside the tank all the way up to the top of the tank 100. The maximum liquid level up to which the level gauge 120 is able to function correctly is designated as $L_{max}$. When, during a filling operation (i.e., when liquid is added to the tank via filler pipe 110), the liquid level reaches $L_{max}$, a controller 140, which receives the level signal from the level gauge 120, causes a fill level limiting valve 130 to close, which causes the filling operation to stop (generally, because a sensor in the filling nozzle detects a rise of pressure inside the tank 100 and the filler pipe 110, triggering the nozzle's shut-off mechanism). The valve 130 is generally in fluid communication with the atmosphere via a venting line, optionally via a vapor absorbing canister (not shown).

Figure 2:
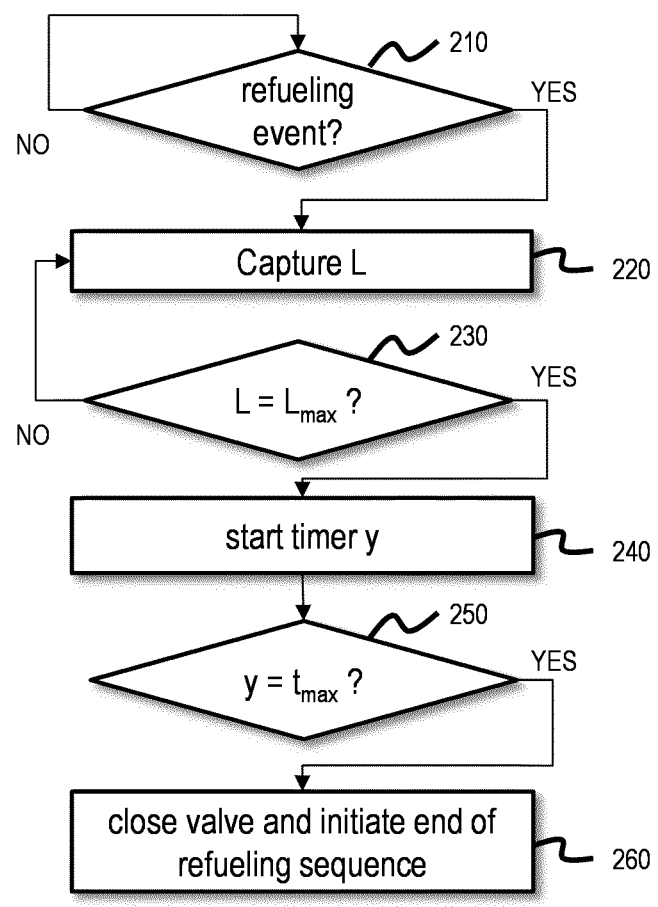
FIG. 2 provides a flow chart of an embodiment of the method according to the present invention.

FIG. 2 provides a flow chart of an embodiment of the method according to the present invention. The depicted process takes place when a refueling event is detected 210. This may consist of detecting the removal of a cap of a filler neck, the insertion of a nozzle, or a sudden rise of the general liquid level inside the tank.

The fuel level L is continuously or intermittently monitored 220 in order to be able to determine 230 whether a predetermined fill level $L_{max}$ has been reached. $L_{max}$ is preferably the maximum level that can be gauged by the level gauge provided in the tank.

If the valve 130 is closed upon reaching $L_{max}$, a non-negligible portion of the tank (designated by the range $L_{top}$) is never used.

Likewise, if a filling operation is attempted when the fill level is still above $L_{max}$, as may be the case when only a very small amount of fuel has been consumed after the previous complete fill-up, it would not be desirable to keep the valve 130 closed, because it would prevent the unused portion of the tank to be filled.

It is an object of embodiments of the present invention, to increase the useful volume of the tank by allowing an amount of liquid to be added to the tank after reaching $L_{max}$. Ideally, the entire gap $L_{top}$ should be allowed to be used.

To this end, when it is detected 230 that the point $L=L_{max}$ is reached, a timer y is started 240. The timer allows the valve to remain open for an additional amount of time $t_{max}$. When the timer expires 250, the valve is closed 260, and the refueling sequence is ended. As the valve is closed 260, a sensor in the filling nozzle detects a rise of pressure inside the tank and the filler pipe, triggering the nozzle's shut-off mechanism. This takes the assumption that the operator allows the pistol to fuel at a constant flow rate i.e. using the predefined latching mechanism on the nozzle until the refueling is complete. As the pressure settles down, the nozzle may allow a brief additional filling (topping off), until a new pressure peak re-triggers the shut-off mechanism.

In this embodiment, $t_{max}$ is a fixed, predetermined amount of time, which is determined in advance in function of the geometry of the tank and the expected maximum filling rate so as to give the filling process enough extra time to fill the volume represented by $L_{top}$. To be on the safe side, the time $t_{max}$ to be used in practice is preferably slightly less than the time needed to completely fill the tank at the maximum filling flow. Preferably, $t_{max}$ is a function of an estimate of an unused capacity of the tank (e.g. capacity that was not used due to an incomplete filling in a previous filling operation, or unused capacity that cannot be detected by the level gauge because a small amount of fuel has been consumed since a previous complete filling).

Figure 3:
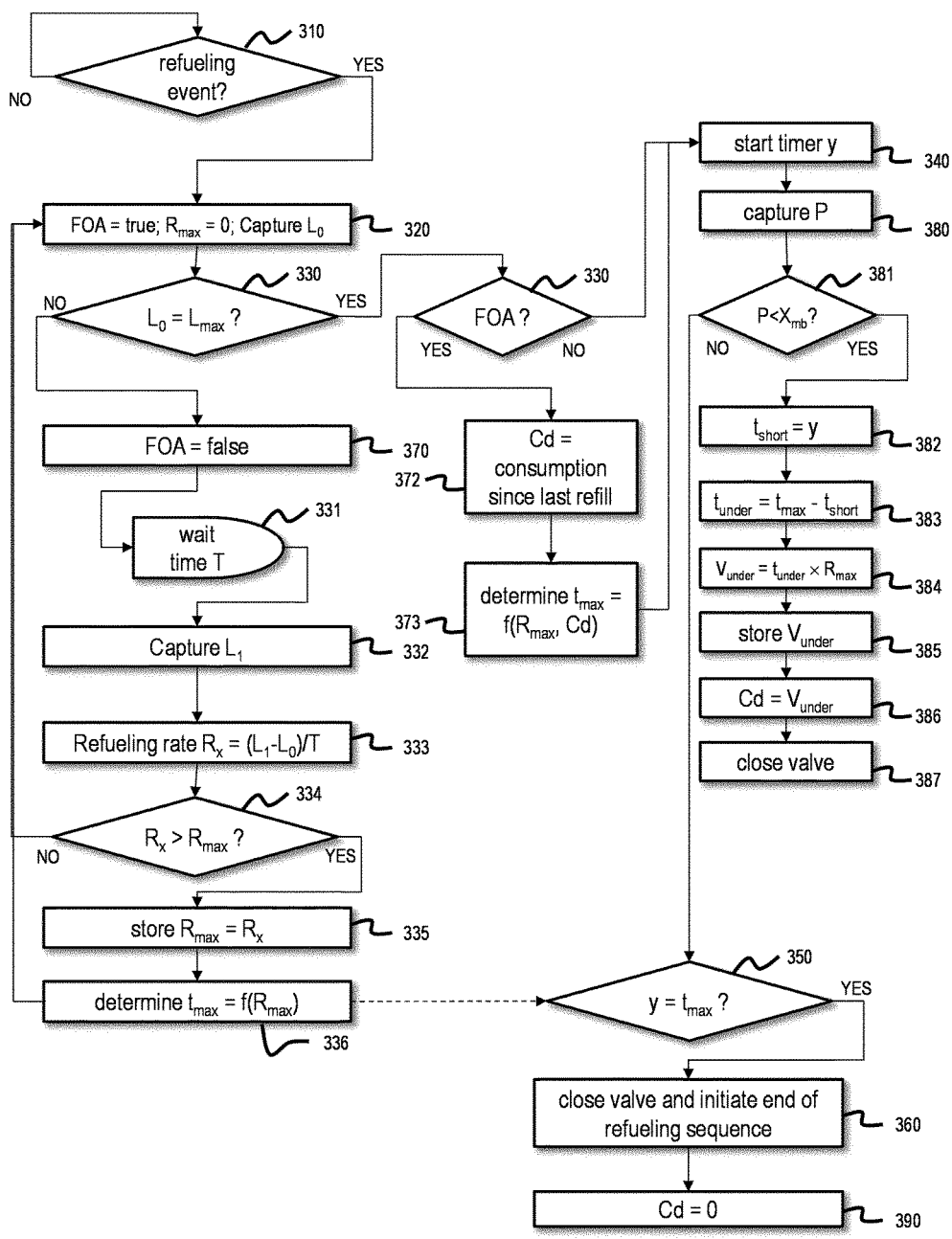
FIG. 3 provides a flow chart of an embodiment of the method according to the present invention.

FIG. 3 provides a flow chart of another embodiment of the method according to the present invention. The depicted process takes place when a refueling event is detected 310, as described above in the context of FIG. 2. An initial fuel level $L_0$ is determined 320 in order to be able to determine 330 whether a predetermined fill level $L_{max}$ has been reached. $L_{max}$ is preferably the maximum level that can be gauged by the level gauge provided in the tank.

When it is detected 330 that the point $L=L_{max}$ is reached, a timer y is started 340. The timer allows the valve to remain open for an additional amount of time $t_{max}$. When the timer expires 350, the valve is closed 360, and the refueling sequence is ended. As the valve is closed 360, a sensor in the filling nozzle detects a rise of pressure inside the tank and the filler pipe, triggering the nozzle's shut-off mechanism. As the pressure settles down, the nozzle may allow a brief additional filling (topping off), until a new pressure peak re-triggers the shut-off mechanism.

In this embodiment, $t_{max}$ is determined "on the fly", for the filling operation in question. This is achieved by measuring the amount of liquid added to the tank in a fixed time interval T. Thus, upon determining $L_0 \neq L_{max}$ 330, a delay of time x is allowed to pass 331, before a new level measurement $L_1$ is carried out 332. The estimated instantaneous filling rate $R_x$ can then be determined 333 by calculating $R_x = (L_1 - L_0)/T$.

In the illustrated case, if the instantaneous filling rate $R_x$ determined in the specific iteration is greater than the previous highest recorded filling rate $R_{max}$ 334, $R_{max}$ is updated 335 to $R_x$. Alternatively (not illustrated), the consecutive measurements $R_x$ may be used to update a running average filling rate $R_{avg}$.

The highest recorded filling rate $R_{max}$ or the average filling rate $R_{avg}$ is used (along with known information about the geometry of the tank) to calculate 336 the maximum allowable additional filling time $t_{max}$. To be on the safe side, the time $t_{max}$ to be used in practice is preferably slightly less than the time needed to completely fill the tank at the maximum filling flow.

Where reference is made to the highest recorded filling rate $R_{max}$, it could be stated in an equivalent way that the smallest calculated value of $t_{max}$ over the iterations is used. While the calculation of $R_{max}$ and $t_{max}$ is described as two distinct steps, the actual calculations may skip the output of $R_{max}$ as a separately intermediate result.

The present invention also pertains to a vehicular liquid storage system (see also FIG. 1) comprising a controller 130 configured to carry out the methods described above. The controller 130 may be implemented in dedicated hardware (e.g., ASIC), configurable hardware (e.g., FPGA), programmable components (e.g., a DSP or general purpose processor with appropriate software), or any combination thereof. The same component(s) may also include other functions.

The vehicular liquid storage system may further comprise a pressure sensor (not illustrated). The estimation of the constant flow can be derived from the evolution of the fuel level sensor reading combined with an evaluation of the internal tank pressure. If, during the last portion of the refueling operation, the pressure level is similar (within a given tolerance) to the pressure level during the stabilized refueling flow, the flow can be considered constant. If, during the last portion of the refueling operation, the pressure level is not within a given tolerance to the pressure level during the stabilized refueling flow, the flow cannot be considered constant. The pressure level is then an indication of the flow rate and by interpolation the required additional refueling time can be calculated.

Furthermore if it is deemed during the first reading 330 that L is already at or above $L_{max}$, it must be concluded that the tank was already (nearly) full on arrival, and the refueling will merely serve to top up the tank for the relatively small quantity of fuel that was consumed since the last filling operation. To correctly account for such situations, a boolean variable FOA is set prior to the first reading 330, and cleared only if the first reading 330 indicates a fuel level below $L_{max}$.

Accordingly, when the fuel level verification 330 is indicative of a nearly full tank (the 'YES' branch of the selection 330 is taken), the system verifies 371 whether FOA is set, in which case an estimation of the fuel consumption between refueling instances 372 is used to define $T_{max}$ 373. This step ensures a proper refueling in the case that the operator used only a small amount of fuel during a drive event, and then refueled again. Without this estimation, the $T_{max}$ previously stored would produce an over-fill condition. If the verification 371 reveals that FOA is not set, the process proceeds as described above—the fact that FOA is not set at this point implies that it was cleared upon the initial verification of the fuel level 330, which in turn implies that the tank was not nearly full on arrival.

As a means to provide further accuracy, the steps 381-387 may be used to estimate the amount of fuel in the tank in the event that the operator stops the refueling process prematurely during the time interval $T_{max}$. To this end, pressure is measured in the tank and if it deemed it has fallen below a level indicative of fuel flowing into the tank 381 then the time at which this pressure level drops is stored 382 and compared to the previously determined $T_{max}$ 383. The new T value is then multiplied by the flow rate $R_x$ 384 to calculate the amount of under-fill that occurred and this value is stored as a base consumption level 385 to add to the consumption of fuel during the next refueling interval 386. The refueling operation is finally terminated by closing the valve 387.

Figure 4:
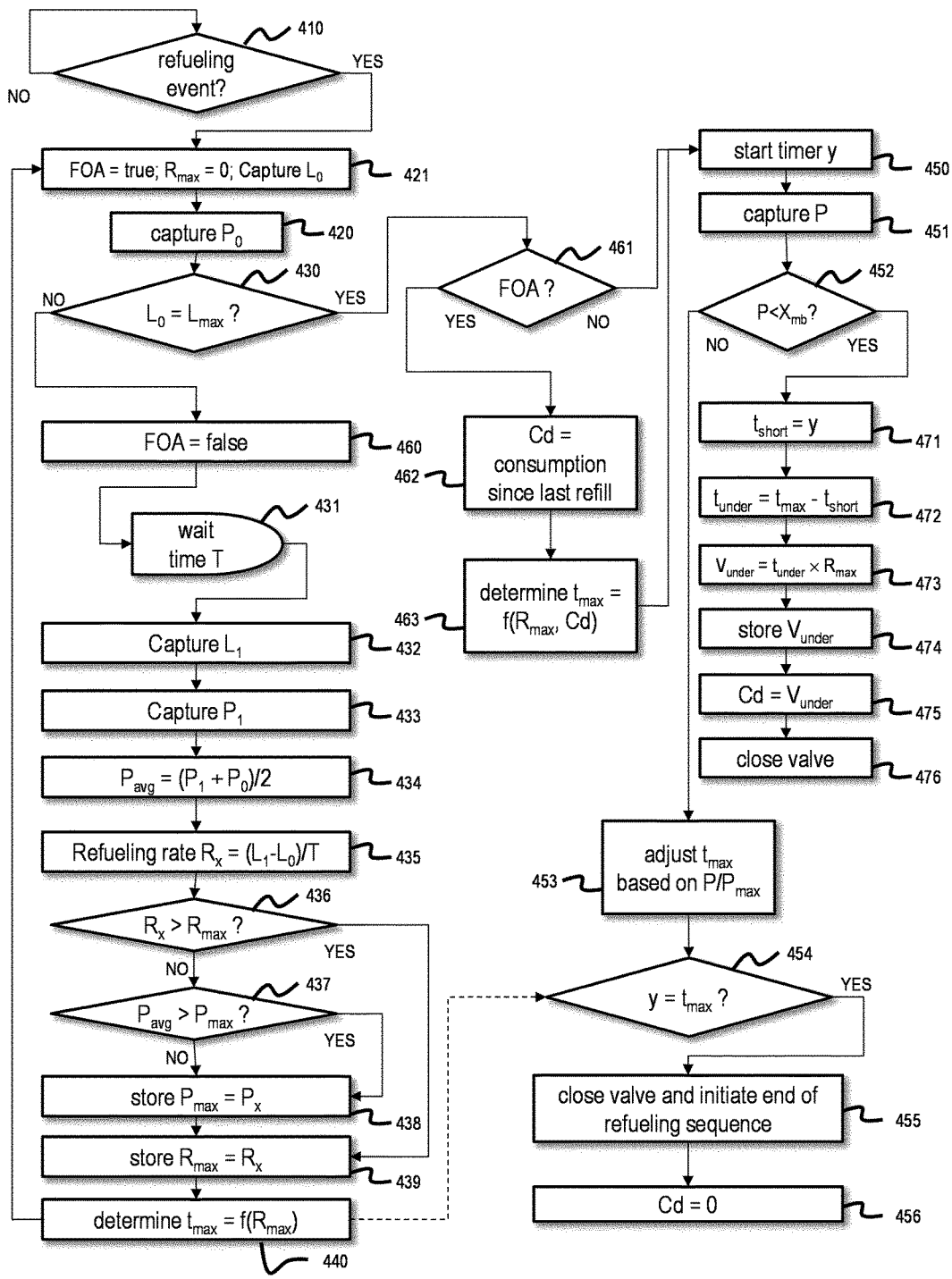
FIG. 4 provides a flow chart of an embodiment of the method according to the present invention.

FIG. 4 provides a flow chart of the steps that may be performed in embodiments of the present invention in order to implement the flow rate estimation described above. The sequence starts with the detection 410 of a refueling event, in a manner analogous to the corresponding step 310 of FIG. 3. An initial fuel level $L_0$ is determined 420 in order to be able to determine 430 whether a predetermined fill level $L_{max}$ has been reached. $L_{max}$ is preferably the maximum level that can be gauged by the level gauge provided in the tank. Also at the start of the refueling vent, the initial pressure $P_0$ is captured 421.

When it is detected 430 that the point $L=L_{max}$ is reached, a timer y is started 450. The timer allows the valve to remain open for an additional amount of time $t_{max}$. When the timer expires 454, the valve is closed 455, and the refueling sequence is ended. As the valve is closed 455, a sensor in the filling nozzle detects a rise of pressure inside the tank and the filler pipe, triggering the nozzle's shut-off mechanism. As the pressure settles down, the nozzle may allow a brief additional filling (topping off), until a new pressure peak re-triggers the shut-off mechanism.

A difference with the embodiment illustrated in FIG. 3, is that the end stage pressure value is captured 451 upon starting timer y 450. If this end stage pressure is equal to $p_{max}$, which has been determined during the first part of the refueling operation (i.e., before reaching $L_{max}$), as will be described below, the fuel flow rate is assumed to be substantially equal to the flow rate that was present when the value of $t_{max}$ was determined, and the timer is allowed to run out as described above. If the captured pressure is not equal to $p_{max}$, the time $t_{max}$ for which the timer y is allowed to run is adjusted accordingly, because the changed pressure condition is indicative of a change in flow rate, which will cause the tank to fill up more slowly or more speedily than originally assumed. In a particular embodiment, the topping-up time is scaled up or down by a factor $p/p_{max}$, which is a first order approximation of the instantaneous fuel flow rate, because a higher flow rate will lead to a greater pressure build-up in the tank.

In this embodiment, as before, $t_{max}$ is determined "on the fly", for the filling operation in question. This is achieved by measuring the amount of liquid added to the tank in a fixed time interval T. Thus, upon determining $L_0 \neq L_{max}$ 430, a delay of time x is allowed to pass 431, before a new level measurement $L_1$ is carried out 432. The estimated instantaneous filling rate $R_x$ can then be determined 435 by calculating $R_x=(L_1-L_0)/T$. At the same stage, a new pressure measurement $p_1$ is carried out 433, and the average pressure for the present refueling operation is updated 434 by calculating $p_{avg}=(p_1+p_0)/2$.

In the illustrated case, if the instantaneous filling rate $R_x$ determined in the specific iteration is greater than the previous highest recorded filling rate $R_{max}$ 436, $R_{max}$ is updated 439 to $R_x$. Alternatively (not illustrated), the consecutive measurements $R_x$ may be used to update a running average filling rate $R_{avg}$.

At the same stage, if the updated average pressure value $p_{avg}$ determined in the specific iteration is greater than the previous highest recorded average pressure $p_{max}$ 437, $p_{max}$ is updated 438 to $p_{avg}$.

The highest recorded filling rate $R_{max}$ or the average filling rate $R_{avg}$ is used (along with known information about the geometry of the tank) to calculate 440 the maximum allowable additional filling time $t_{max}$. To be on the safe side, the time $t_{max}$ to be used in practice is preferably slightly less than the time needed to completely fill the tank at the maximum filling flow.

Where reference is made to the highest recorded filling rate $R_{max}$, it could be stated in an equivalent way that the smallest calculated value of $t_{max}$ over the iterations is used. While the calculation of $R_{max}$ and $t_{max}$ is described as two distinct steps, the actual calculations may skip the output of $R_{max}$ as a separately intermediate result.

As already described in the context of FIG. 3, if it is deemed during the first reading 430 that L is already at or above $L_{max}$, it must be concluded that the tank was already (nearly) full on arrival, and the refueling will merely serve to top up the tank for the relatively small quantity of fuel that was consumed since the last filling operation. To correctly account for such situations, a boolean variable FOA is set prior to the first reading 430, and cleared only if the first reading 430 indicates a fuel level below $L_{max}$.

Accordingly, when the fuel level verification 430 is indicative of a nearly full tank (the 'YES' branch of the selection 430 is taken), the system verifies 461 whether FOA is set, in which case an estimation of the fuel consumption between refueling instances 462 is used to define $T_{max}$ 463. This step ensures a proper refueling in the case that the operator used only a small amount of fuel during a drive event, and then refueled again. Without this estimation, the $T_{max}$ previously stored would produce an over-fill condition. If the verification 461 reveals that FOA is not set, the process proceeds as described above—the fact that FOA is not set at this point implies that it was cleared upon the initial verification of the fuel level 430, which in turn implies that the tank was not nearly full on arrival.

As a means to provide further accuracy, the steps 470-476 may be used to estimate the amount of fuel in the tank in the event that the operator stops the refueling process prematurely during the time interval $T_{max}$. To this end, pressure is measured in the tank and if it deemed it has fallen below a level indicative of fuel flowing into the tank 470 then the time at which this pressure level drops is stored 471 and compared to the previously determined $T_{max}$ 472. The new T value is then multiplied by the flow rate $R_x$ 473 to calculate the amount of under-fill that occurred and this value is stored as a base consumption level 474 to add to the consumption of fuel 475 during the next refueling interval. The refueling operation is finally terminated by closing the valve 476.

The present invention also pertains to a computer program product configured to cause a controller of a vehicular liquid storage system to carry out the methods described above.

The implementation of the present invention in software allows a refueling operation that can be calibrated by software, with the possibility of filling the tank above the maximum readable level of a level sensor. The result is a huge decrease in development time as well as commoditization of components as the venting system only needs to provide venting of the vapor space in the tank and rollover protection. This means that it can be designed to have a shutoff height as close to the top of the tank as possible.

While the invention has been described hereinabove with reference to specific embodiments, this was done to clarify and not to limit the invention. The skilled person will appreciate that various modifications and different combinations of disclosed features are possible without departing from the scope of the invention.

The invention claimed is:

1. A method for controlling an automatic filling operation of a vehicular liquid storage system including a tank including a fill level limiting valve, the method comprising:
   detecting start of a first filling event;
   measuring a first fill level of the tank;
   verifying whether the measured first fill level has reached a predetermined fill level, the predetermined fill level being a maximum liquid level that can be gauged by a level gauge within the tank;
   when the verifying is positive, starting a timer for a first amount of time based on an estimate of an unused capacity of the tank;
   upon expiry of the first amount of time of the timer, closing the fill level limiting valve.

2. The method according to claim 1, further comprising:
   obtaining an estimate of an amount of fuel consumed between the first filling event and a previous filling event; and
   determining the first amount of time on the basis of the estimated amount of consumed fuel.

3. The method according to claim 1, further comprising:
   detecting an end of the first filling event occurring during the first amount of time; and
   estimating a remaining unused capacity of the tank at the end of the first filling event.

4. The method according to claim 3, further comprising:
   detecting start of a subsequent filling event;
   measuring a subsequent fill level of the tank;
   verifying whether the measured subsequent fill level has reached the predetermined fill level; and
   when the verifying is positive:
      obtaining an estimate of an amount of fuel consumed between the subsequent filling event and the first filling event;
      determining a subsequent amount of time on the basis of the estimated amount of consumed fuel, increased by an amount proportional to the estimated remaining unused capacity of the tank;
      starting the timer for the subsequent amount of time; and
      upon expiry of the subsequent amount of time of the timer, closing the fill level limiting valve.

5. The method according to claim 1, wherein the first amount of time is increased by an amount proportional to an estimate of an unused capacity of the tank at an end of a previous filling operation.

6. The method according to claim 1, further comprising:
   when the verifying is negative, delaying for a second amount of time;
   upon expiry of the second amount of time, measuring a second fill level of the tank;
   determining the first amount of time on the basis of the first fill level, the second fill level, and the second amount of time.

7. The method according to claim 6, wherein the verifying, the delaying, the measuring of the second fill level, and the determining of the first amount of time are carried out iteratively, and wherein a minimum value of the first amount of time as obtained over a plurality of iterations is used in the starting the timer.

8. The method according to claim 6, wherein the verifying, the delaying, the measuring of the second fill level, and the determining of the first amount of time are carried out iteratively, and wherein an average value of the first amount of time as obtained over a plurality of iterations is used in the starting the timer.

9. The method according to claim 6, further comprising:
   determining a reference pressure level during the second amount of time;
   determining an end stage pressure level upon finding that the second verifying is positive; and
   adjusting the determined first amount of time in function of a ratio between the end stage pressure level and the reference pressure level.

10. The method according to claim 1, wherein the vehicular liquid storage system is a fuel storage system.

11. The method according to claim 1, wherein the vehicular liquid storage system is a system for storing an aqueous urea solution.

12. A non-transitory computer readable medium comprising computer code means configured to cause a processor to carry out the method of claim 1.

13. A vehicular liquid storage system comprising:
   a tank including a fill level limiting valve;
   a level gauge; and
   a controller configured to obtain fill levels from the level gauge and to control the fill level limiting valve, the controller being configured to carry out the method of claim 1.

* * * * *